Oct. 4, 1938.                C. KOWALEWSKA                2,132,265
                      HOLDER FOR LACEWORK AND THE LIKE
                           Filed Feb. 20, 1937

Inventor:
Czeslawa Kowalewska.
By: Brayton Richards
                Attorney.

Patented Oct. 4, 1938

2,132,265

UNITED STATES PATENT OFFICE 2,132,265

HOLDER FOR LACEWORK AND THE LIKE

Czeslawa Kowalewska, Chicago, Ill., assignor of forty-nine percent to Phyllis Kachnowski, Chicago, Ill.

Application February 20, 1937, Serial No. 126,946

2 Claims. (Cl. 28—15)

The invention relates to improvements in holders for lace-work and the like and has for its object the provision of an improved holder of this character which is of simple construction and highly efficient in use.

Other objects will appear hereinafter.

The invention consists in the combinations and arrangements of parts hereinafter described and claimed.

Figure 1:
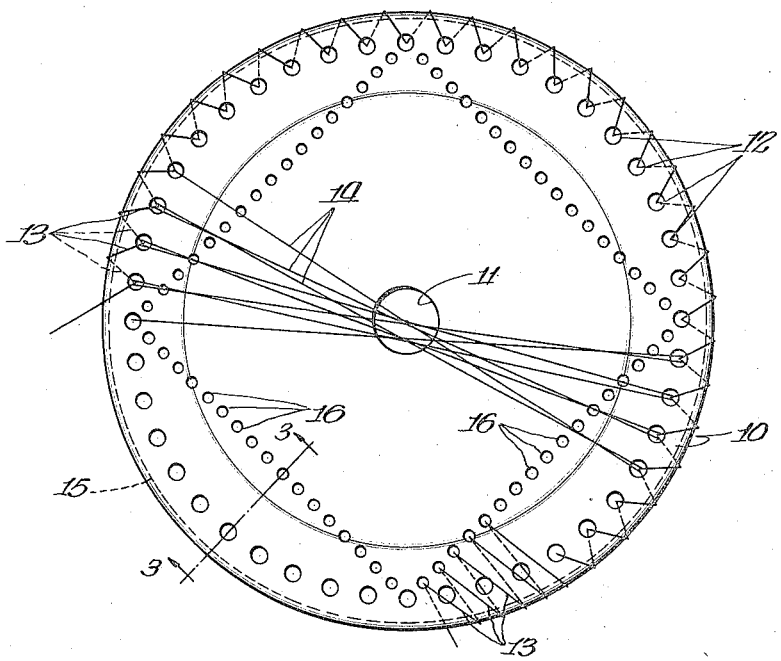
Figure 2:

The invention will be best understood by reference to the accompanying drawing forming a part of this specification and in which Fig. 1 is a plan view of a holder embodying the invention;

Fig. 2 an edge view of the same; and

Figure 3:
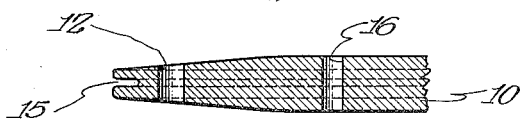

Fig. 3 a partial transverse section of the same.

The embodiment of the invention illustrated in the drawing comprises a circular flat plate 10 which may be made of wood, composition board, heavy paper, cardboard, or the like. For convenience in holding and manipulating the same the plate 10 is provided with a central finger hole 11. The series of holes 12 are arranged as shown adjacent and parallel to the periphery of the plate 10 and a strand in the form of a holding thread 13 is passed successively through the holes 12 and around the periphery of the plate 10. Loops 14 are engaged with the loops or turns of the strand 13 as indicated in Fig. 1 to serve as the basis or foundation for suitable lace-work to be plied or incorporated therewith as will be readily understood by those skilled in this art. The plate 10 is provided with a peripheral groove 15 to facilitate cutting of the turns or coils of the thread 13 when it is desired to remove the finished lace-work from the holder. By this arrangement a simple and effective holder of the class described is provided which is capable of economical production and highly efficient in use.

If desired, holes 16 may also be provided in the plate 10 arranged as indicated as near as possible to the periphery of said plate and in the outline of a square. The strand 13 may then be passed successively through the holes 16 and around the periphery of the plate 10 to serve as holding means for loops as before, and whereby a square pattern of lace-work may readily be produced.

While I have illustrated and described the preferred form of construction for carrying the invention into effect, this is capable of variation and modification without departing from the spirit of the invention. I, therefore, do not wish to be limited to the precise details of the construction set forth, but desire to avail myself of such variations and modifications as fall within the scope of the appended claims.

I claim:

1. A device of the class described comprising a body having a series of holes adjacent its periphery and a cutting groove in its periphery; and a holding strand passing successively through said holes and around said periphery.

2. A device of the class described comprising a circular flat plate having a series of holes adjacent and parallel to its periphery and a cutting groove in its periphery; a holding strand passing successively through said holes and around said periphery forming loops; and strand loops extending diametrically across said body and engaging said first mentioned loops.

CZESLAWA KOWALEWSKA.